United States Patent [19]

Dean et al.

[11] Patent Number: 4,636,370

[45] Date of Patent: * Jan. 13, 1987

[54] NON-CATALYTIC METHOD FOR REDUCING THE CONCENTRATION OF NO IN COMBUSTION EFFLUENTS BY INJECTION OF AMMONIA AT TEMPERATURES FROM ABOUT 975 DEGREES K. TO 1300 DEGREES K.

[75] Inventors: Anthony M. Dean, Hampton; Anthony J. DeGregoria, Flemington; James E. Hardy, Lebanon; Boyd E. Hurst, Long Valley; Richard K. Lyon, Pittstown, all of N.J.

[73] Assignee: Exxon Research & Engineering Company, Florham Park, N.J.

[ * ] Notice: The portion of the term of this patent subsequent to Mar. 26, 2002 has been disclaimed.

[21] Appl. No.: 715,119

[22] Filed: Mar. 22, 1985

Related U.S. Application Data

[63] Continuation-in-part of Ser. No. 550,398, Nov. 10, 1983, Pat. No. 4,507,269.

[51] Int. Cl.$^4$ .......................... C01B 21/00; B01J 8/00
[52] U.S. Cl. ..................................... 423/235; 423/239
[58] Field of Search ................... 423/235, 235 D, 239, 423/239 A

[56] References Cited

U.S. PATENT DOCUMENTS

| | | | |
|---|---|---|---|
| 3,681,659 | 8/1972 | Shaw et al. | 75/134 F |
| 3,900,554 | 8/1975 | Lyon | 423/235 |
| 4,104,294 | 8/1978 | Grose et al. | 260/448 |
| 4,129,651 | 12/1978 | Koike et al. | 423/235 |
| 4,507,269 | 3/1985 | Dean et al. | 423/235 |

FOREIGN PATENT DOCUMENTS

| | | | |
|---|---|---|---|
| 2657617 | 9/1977 | Fed. Rep. of Germany | 423/235 D |
| 2803876 | 3/1978 | Fed. Rep. of Germany | 423/235 D |
| 53-63625 | 6/1978 | Japan | 423/235 |

OTHER PUBLICATIONS

S. Salimian et al., A Kinetic Study of NO Removal from Combustion Gases by Injection of $HN_1$-Containing Compounds, Combustion Science and Technology, vol. 23, pp. 225-230 (1980).

James A. Miller et al., A Chemical Kinetic Model for the Selective Reduction of Nitric Oxide by Ammonia, Combustion and Flame 43:81-98 (1981).

Joel A. Silver, A Chemical Model for the Reduction of Nitric Oxide by Ammonia in Post Combustion Flows, Journal of Physical Chemistry.

Primary Examiner—Gregory A. Heller
Attorney, Agent, or Firm—Henry E. Naylor

[57] ABSTRACT

Disclosed is a method for non-catalytically reducing the concentration of NO in combustion effluents by the injection of ammonia into an effluent stream where the stream is at a temperature from about 975° K. to 1300° K. More particularly, the amount of $NH_3$ and its point of injection are determined by the solution of a set of simultaneous equations derived from the kinetic model disclosed herein. Particular benefits of the present invention occur when ammonia is injected into a cooling zone.

6 Claims, 1 Drawing Figure

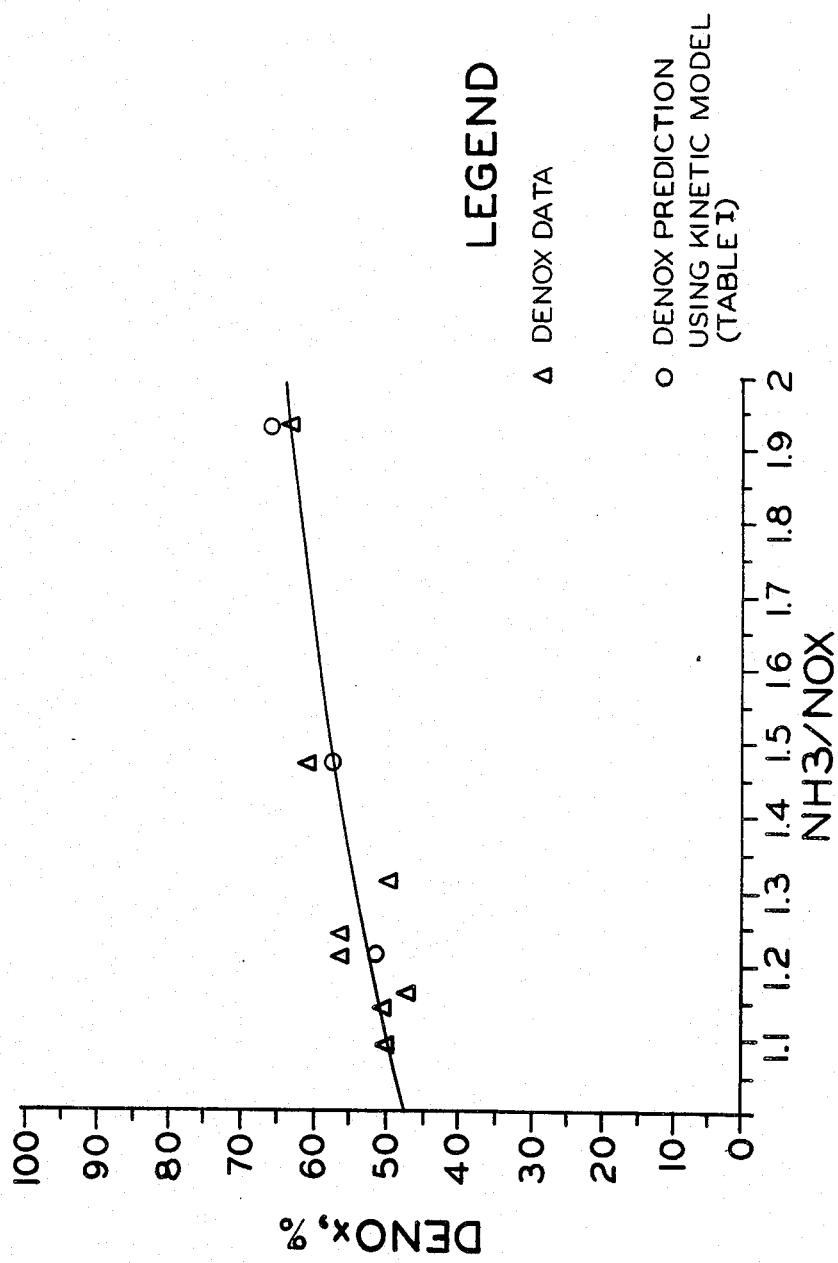

NON-CATALYTIC METHOD FOR REDUCING THE CONCENTRATION OF NO IN COMBUSTION EFFLUENTS BY INJECTION OF AMMONIA AT TEMPERATURES FROM ABOUT 975 DEGREES K. TO 1300 DEGREES K.

CROSS REFERENCE TO RELATED APPLICATIONS

This is a continuation-in-part application of U.S. Ser. No. 550,398, filed Nov. 10, 1983, now U.S. Pat. No. 4,507,269.

FIELD OF THE INVENTION

The present invention relates to a non-catalytic method for reducing the concentration of NO in combustion effluents by the injection of ammonia into an effluent stream where the stream is at a temperature from about 975° K. to 1300° K. More particularly, the amount of $NH_3$, and its point of injection are determined by the solution of a set of simultaneous equations derived from the kinetic model disclosed herein. Particular benefits of the present invention occur when ammonia is injected into a cooling zone.

BACKGROUND OF THE INVENTION

Combustion effluents and waste products from various installations are a major source of air pollution when discharged into the atmosphere. One particularly troublesome pollutant found in many combustion effluent streams is $NO_2$, a major irritant in smog. Furthermore, it is believed that $NO_2$ undergoes a series of reactions known as photo-chemical smog formation, in the presence of sunlight and hydrocarbons. The major source of $NO_2$ is NO which to a large degree is generated at such stationary installations as gas and oil-fired steam boilers for electric power plants, process heaters, incinerators, coal fired utility boilers, glass furnaces, cement kilns, oil field steam steam generators.

Various methods have been developed for reducing the concentration of nitrogen oxides in combustion effluents. One such method which was developed was a non-catalytic thermal $deNO_x$ method disclosed in U.S. Pat. No. 3,900,554 to Lyon which patent is incorporated herein by reference. The process disclosed in that patent shows in its examples the reduction of NO to $N_2$ by injecting ammonia into the combustion effluent stream at a temperature from about 975° K. to about 1375° K. in a reaction zone which is substantially isothermal, i.e. the temperature of the gases in the reaction zone changes at a rate less than about 50° K./sec. Since the issuance of U.S. Pat. No. 3,900,554, there has been a proliferation of patents and publications relating to the injection of ammonia into combustion effluent streams for reducing the concentration of NO.

Conventional non-catalytic thermal $deNO_x$ processes are limited in that they teach the injection of ammonia into a constant temperature, or isothermal zone. This is limiting because in a conventional boiler or heater, operating at constant load, combustion effluents typically leave the burner flames at temperatures greater than about 1875° K. As they travel through the boiler or heater they cool in stages—not continually. This staged cooling occurs because of the manner of heat removal from the combustion effluents. Heat is usually removed by heat transfer tubes which are arranged in banks with substantial cavities between the banks. Consequently, combustion effluents are rapidly cooled while they flow through a tube bank, undergo very little cooling as they pass through a cavity, rapidly cool again while passing through another tube bank, etc. U.S. Pat. No. 4,115,515 to Tenner et al, also incorporated herein by reference, teaches that the injection apparatus should be installed in a cavity in such a manner that the ammonia contacts the combustion effluent stream as the effluents come into the cavity. Such a process has the effect that the reaction time, that is the time at constant temperature during which ammonia could reduce $NO_x$, is the total time the combustion effluents spend passing through a cavity. Unfortunately, in some boilers and heaters, this reaction time—though adequate to provide a useful $NO_x$ reduction—is not sufficient to provide as great a reduction in $NO_x$ concentration as may be environmentally desirable. Consequently, it would be desirable to be able to conduct non-catalytic $deNO_x$, not only in an isothermal zone, but also in a non-isothermal zone.

Therefore, there is still a need in the art for methods of practicing non-catalytic $NO_x$ reduction processes which will overcome, or substantially decrease, the limitations of conventional practices.

SUMMARY OF THE INVENTION

In accordance with the present invention there is provided a process for noncatalytically reducing the concentration of NO in combustion effluents containing NO and at least 0.1 volume percent oxygen at temperatures from about 975° K. to 1300° K. by injecting ammonia into the combustion effluent. The amount of ammonia and the point of its injection are determined by the solution of the set of simultaneous equations derived from the kinetic model of Table I hereof.

In one preferred embodiment of the present invention ammonia is injected at a point upstream from a cooling zone cooling at a rate of at least about 50° K., and in such an amount so that when the combustion effluent reaches the cooling zone, it contains at least 0.4 moles of ammonia per mole of NO.

BRIEF DESCRIPTION OF THE FIGURES

The sole FIGURE hereof shows actual performance data versus predicted performance data generated by use of the kinetic model disclosed herein, for a 235 megawatt utility boiler.

DETAILED DESCRIPTION OF THE INVENTION

As is well-known, combustion is effected in stationary combustion equipment such as boilers, furnaces and incinerators in a section of the equipment commonly referred to as a firebox. Generally, this is accomplished by igniting a suitable fuel, in the presence of air, with one or more burners. Materials other than conventional fuels can, however, be combusted in the firebox portions of the equipment which is generally the case when combustion is effected in an incinerator. In any event, the principal combustion products are carbon dioxide and steam and those products, along with the other combustion products such as carbon monoxide and the various oxides of nitrogen and sulfur, combined with any excess oxygen and unconverted nitrogen to form what is referred to herein as a combustion effluent. The combustion effluent will also contain about 0.1 to 15 volume percent oxygen, preferably about 1 to 3 volume percent.

The temperature of the combustion effluent is, then, a maximum at or near the point of combustion and decreases axially (along the flow path) and radially (outwardly) as the effluent moves along its flow path from the point of combustion until it is, ultimately, emitted to the atmosphere or otherwise loses its identity as a combustion effluent. As previously mentioned, the combustion effluents, as they travel through the combustion apparatus cool in stages. That is, rapid cooling will occur when the combustion effluent is in contact with heat exchange equipment, such as heat transfer tubes. The prior art teaches that $NO_x$ reduction was only possible in the cavities between then cooling zones as opposed to in the cooling zones themselves. By practice of the present invention $NO_x$ can now be achieved at high temperatures in or immediately before a cooling zone, as well as in an isothermal zone.

The amount of ammonia used herein ranges from about 0.5 to 10 moles, preferably 1 to 3 moles of ammonia per mole of NO to be removed.

The reaction may be carried out at pressures from 0.1 atmospheres to 100 atmospheres. The velocities of the combustion effluents as well as the mixing of the ammonia in the post-combustion zone are regulated so that there is an effective residence time, in a temperature range of about 975° K. to 1300° K., to enable the ammonia to remove $NO_x$ from the combustion effluent stream. The residence time will range from about 0.001 to 10 seconds.

Practice of the present invention enables a more effective non-catalytic $deNO_x$ operation at temperatures from about 975° K. to about 1300° K., with particular advantages when ammonia is injected into the effluent stream at a place where the stream is cooling at a rate of at least about 50° K./sec.

Because it is difficult to accurately simulate, on a laboratory scale, the temperature time history of combustion effluents as they pass through a tube bank, it is necessary to generate examples by means other than laboratory experiments. Complex chemical reactions occur by a series of elementary reaction steps and if one knows the rate constants for such steps, a theoretical kinetic mechanism can be developed and verified through comparison with experimental data. An extensive block of kinetic data was developed herein by use of apparatus similar to the apparatus taught in U.S. Pat. No. 3,900,554 and used to determine which elementary reactions would likely be of significance during the reduction of NO by $NH_3$. For many of the reactions, the rate constants were well-known accurately measured constants of nature whereas for the remaining reactions the rate constants were not accurately known and accordingly were taken as adjustable parameters. That is, values for the unknown rate constants were assumed, the reaction kinetics to be expected from these rate constants were calculated and compared with the observed kinetics. Based on this comparison a new set of rate constants was assumed, etc., until satisfactory agreement between calculation and experimentation were finally obtained. As a result, the kinetic model hereof and respective rate constants were developed by the inventors hereof for accurately predicting the conditions for the practice of the present invention.

In the practice of the present invention the effluent stream to be treated is measured to determine the content of NO, $O_2$, and $H_2O$. These initial conditions, as well as cooling rate measurements of appropriate cooling zones having a temperature in the range of about 975° K. and 1600° K. are used in conjunction with the kinetic model hereof with appropriate software to determine the amount of ammonia and an injection point which will give NO reduction. Appropriate software suitable for use herein would be any computer program designed for numerical integration of chemical rate expressions. A non-limiting example of such software is CHEMKIN; A General-Purpose, Problem-Independent, Transportable, Fortran Chemical Kinetics Code Package; R. J. Kee, J. A. Miller, and T. H. Jefferson, an unlimited released Sandia National Laboratory Report SAND80-8003 (1980). This report is also available through the National Technical Information Service, U.S. Department of Commerce.

The following example is offered to demonstrate the validity of the kinetic model employed herein. The model was used to calculate the NO reduction to be expected for a 235 megawatt utility boiler of the following characteristics:

Flue Gas Flow Rate 2,000,000 lb/hr at 3–4% $O_2$ dry
Flue Gas Temperature 880°–1040° C.
NO Conc. 190–220 ppm at 3–4% $O_2$ dry FIG. 1 (diamonds) contains actual performance data on the above boiler at full load with a best fit curve through the data. The circles in FIG. 1 represent paper data generated by use of the kinetic model hereof. The FIGURE illustrates the surprisingly good agreement of model data vs. actual data.

The good agreement between predicted and observed NO reduction illustrates that the kinetic model is reliable for calculating NO reduction.

The advantages of the kinetic computer model hereof are substantial in that it permits one skilled in the art to readily determine, by calculation, the embodiment of the present invention which will yield optimum results for his particular circumstances. In general, however, it may be said that the present invention is an improved method of noncatalytic reduction of NO with $NH_3$, the improvement of the present invention relating to the temperature at which the $NH_3$ is contacted with the NO containing combustion effluents. This contacting is done at temperatures from about 975° K. to about 1600° K. at a point where the combustion effluents are cooling at a rate of at least 50° K./sec for temperatures of injection up to about 1300° K. and cooling at a rate of at least abouot 250° K. for injection temperatures from about 1300° K. to 1600° K. or at a point where enough ammonia is still present such that the volume ratio of ammonia to $NO_x$ is in the range of about 0.4 to 10 when it enters a cooling zone. Generally, the ammonia can be injected up to 0.04 seconds upstream from a cooling zone, preferably 0.02 seconds, and more preferably 0.01 seconds. The higher portion of the 1300° K. to 1600° K. temperature range relates to higher initial NO concentrations, lower $O_2$ content of the combustion effluents, higher cooling rates and shorter delay times prior to cooling. To a somewhat lesser degree, the upper portion of the temperature range is also associated with higher $H_2O$ content.

TABLE I

KINETIC MODEL
Rate constant $K = AT^n \exp(-E/(1.98)T)$

| REACTION | A | n | E |
|---|---|---|---|
| 1. $NH_3 + O = NH_2 + H_2$ | .246E + 14 | 0.0 | 17071. |
| 2. $NH_3 + O = NH_2 + OH$ | .150E + 13 | 0.0 | 6040. |
| 3. $NH_3 + OH = NH_2 + H_2O$ | .326E + 13 | 0.0 | 2120. |
| 4. $HNO + M = NO + H + M$ | .186E + 17 | 0.0 | 48680. |
| 5. $HNO + OH = NO + H_2O$ | .360E + 14 | 0.0 | 0. |

TABLE I-continued

KINETIC MODEL
Rate constant $K = AT^n \exp(-E/(1.98)T)$

| REACTION | A | n | E |
|---|---|---|---|
| 6. $NH_2 + HNO = NH_3 + NO$ | .175E + 15 | 0.0 | 1000. |
| 7. $NH_2 + NO = NNH + OH$ | .610E + 20 | −2.46 | 1866. |
| 8. $NH_2 + O_2 = HNO + OH$ | .510E + 14 | 0.0 | 30000. |
| 9. $NNH + NH_2 = N_2 + NH_3$ | .100E + 14 | 0.0 | 0. |
| 10. $NH_2 + O = NH + OH$ | .170E + 14 | 0.0 | 1000. |
| 11. $NH_2 + OH = NH + H_2O$ | .549E + 11 | 0.68 | 1290. |
| 12. $NH_2 + H = NH + H_2$ | .500E + 12 | 0.5 | 2000. |
| 13. $NH + O_2 = NHO + O$ | .300E + 14 | 0.0 | 3400. |
| 14. $H_2 + OH = H_2O + H$ | .220E + 14 | 0.0 | 5150. |
| 15. $H + O_2 = OH + O$ | .220E + 15 | 0.0 | 16800. |
| 16. $O + H_2 = OH + H$ | .180E + 11 | 1.0 | 8900. |
| 17. $H + HO_2 = OH + OH$ | .250E + 15 | 0.0 | 1900. |
| 18. $O + HO_2 = O_2 + OH$ | .480E + 15 | 0.0 | 1000. |
| 19. $OH + HO_2 = H_2O + O_2$ | .500E + 14 | 0.0 | 1000. |
| 20. $OH + OH = O + H_2O$ | .630E + 13 | 0.0 | 1090. |
| 21. $HO_2 + NO = NO_2 + OH$ | .343E + 13 | 0.0 | −260. |
| 22. $H + NO_2 = NO + OH$ | .350E + 15 | 0.0 | 1500. |
| 23. $O + NO_2 = NO + O_2$ | .100E + 14 | 0.0 | 600. |
| 24. $H + O_2 + M = HO_2 + M$ $H_2O/21**$ | .150E + 16 | 0.0 | −995. |
| 25. $NNH + M = N_2 + H + M$ | .200E + 15 | 0.0 | 30000. |
| 26. $NO_2 + M = NO + O + M$ | .110E + 17 | 0.0 | 66000. |
| 27. $NH_3 + M = NH_2 + H + M$ | .480E + 17 | 0.0 | 93929. |
| 28. $O + O + M = O_2 + M$ | .138E + 19 | −1.0 | 340. |
| 29. $NH_2 + NO = N_2 + H_2O$ | .910E + 20 | −2.46 | 1866. |
| 30. $NNH + OH = N_2 + H_2O$ | .300E + 14 | 0.0 | 0. |
| 31. $NNH + NO = N_2 + HNO$ | .906E + 12 | 0.0 | 0. |

**i.e. $A = 21 \times .15E + 16$ for $H_2O$ as "third body".

Given this model, one having ordinary skill in the art can identify a corresponding set of simultaneous equations for solution.

EXAMPLE OF USE OF KINETIC MODEL

To illustrate the practice of the present invention and its advantage over the prior art the paper examples below are presented.

A utility boiler is assumed with the following operating conditions which can be considered normal for such boilers: An excess air level of 100% while firing a fuel oil of H to C ratio of 1.4. The boiler thus produces a flue gas containing 10% $O_2$, 5.88% $CO_2$, 4.12% $H_2O$ and 80% $N_2$. There will also be traces of NO, the exact amount depending on the fuel's nitrogen content and the manner in which the fuel is burned. In this example the NO level is assumed to be 250 vppm.

Combustion flue gas would exit the burners at a very high temperature and cool as it passes through the rest of the boiler. Typically, boilers have a radiative section, a large empty section through which the flue gas passes, cooling by radiation as it travels, and a convection section, a section filled with banks of heat exchange tubes, the flue gas cooling by convection as it passes through these tube banks. As mentioned above there are usually cavities between banks of tubes. For purposes of this example let us assume that the boiler has one cavity between the tube banks wherein the temperature is approximately constant and equal to 1200° K., the residence time of the flue gas within this cavity being 0.05 seconds.

Now to illustrate the limitations of the prior art we will consider the application to the prior art teaching to the above case. According to the prior art (U.S. Pat. Nos. 3,900,554 and 4,115,515) one would inject $NH_3$ as the flue gas enters the cavity. We will assume that the amount of $NH_3$ injection is 375 ppm which is well within the ranges taught by the prior art. Thus one has 0.05 seconds reaction time in the cavity for the $NH_3$ to reduce the NO.

As shown in Table II the model calculates that the NO will be reduced to 109.1 ppm, and while reduction to this level is clearly a useful result, even greater reductions would be desirable. While it is not beyond the scope of the prior art to locate the $NH_3$ injection point within the tubing bank upstream of the cavity, the prior art provides no teaching as to where within the tubing bank the $NH_3$ injection point should be located for optimum results. Neither does the prior art provide the user with any way of knowing whether or not a given upstream location will provide a better or worse NO reduction. Further, while one could answer these questions empirically it would be difficult and expensive. The resultant information would be of little use in the next boiler where conditions would be somewhat different since the extent of NO reduction is a complex function of the temperature and the concentrations of NO, $NH_3$, $O_2$ and $H_2O$.

For purposes of example it is assumed that the cooling rate in the upstream tube bank is 1000° K. per sec. As shown in Table III, the optimum reduction occurs for the $NH_3$ injection point located at the point within the tube bank at which the temperature is 1280° K.

TABLE II

Comparative Example of NO Reduction By Injection of $NH_3$ Into a Cavity with a 0.05 Sec Residence Time

| Temperature at point of Injection | No Remaining PPM | $NH_3$ Remaining PPM |
|---|---|---|
| 1200° K. | 109.1 | 212.8 |

TABLE III

Injection of $NH_3$ Into Tube Bank Cooling Rate = 1000° K./Sec Upstream of a Cavity having a 0.05 Sec Residence Time and Temperature of 1200° K. at Injection Point

| Temperature (°K.) at Point of Injection | NO Remaining PPM | $NH_3$ Remaining PPM |
|---|---|---|
| 1210 | 89.88 | 187.2 |
| 1220 | 73.32 | 162.8 |
| 1230 | 60.72 | 140.1 |
| 1240 | 52.10 | 119.3 |
| 1250 | 46.62 | 99.65 |
| 1260 | 43.50 | 80.77 |
| 1270 | 42.70 | 62.44 |
| 1280 | 40.28 | 58.31 |
| 1290 | 45.64 | 29.11 |
| 1300 | 51.03 | 16.24 |

What is claimed is:

1. A process for reducing NO concentration of a combustion effluent containing NO and at least 0.1 volume percent oxygen when at least a portion of the combustion effluent is at a temperature within the range of about 975° K. to about 1300° K. which process comprises injecting ammonia in an amount and at a location determined by the solution of a set of simultaneous equations derived from the kinetic model:

Rate constant $K = \exp(-E/(1.98)T)$

| REACTION | A | n | E |
|---|---|---|---|
| $NH_3 + O = NH_2 + H_2$ | .246E + 14 | 0.0 | 17071. |
| $NH_3 + O = NH_2 + OH$ | .150E + 13 | 0.0 | 6040. |
| $NH_3 + OH = NH_2 + H_2O$ | .326E + 13 | 0.0 | 2120. |
| $HNO + M = NO + H + M$ | .186E + 17 | 0.0 | 48680. |
| $HNO + OH = NO + H_2O$ | .360E + 14 | 0.0 | 0. |

-continued

| Rate constant K =exp (−E/(1.98)T) | | | |
|---|---|---|---|
| REACTION | A | n | E |
| $NH_2 + HNO = NH_3 + NO$ | .175E + 15 | 0.0 | 1000. |
| $NH_2 + NO = NNH + OH$ | .610E + 20 | −2.46 | 1866. |
| $NH_2 + O_2 = HNO + OH$ | .510E + 14 | 0.0 | 30000. |
| $NNH + NH_2 = N_2 + NH_3$ | .100E + 14 | 0.0 | 0. |
| $NH_2 + O = NH + OH$ | .170E + 14 | 0.0 | 1000. |
| $NH_2 + OH = NH + H_2O$ | .549E + 11 | 0.68 | 1290. |
| $NH_2 + H = NH + H_2$ | .500E + 12 | 0.5 | 2000. |
| $NH + O_2 = NHO + O$ | .300E + 14 | 0.0 | 3400. |
| $H_2 + OH = H_2O + H$ | .220E + 14 | 0.0 | 5150. |
| $H + O_2 = OH + O$ | .220E + 15 | 0.0 | 16800. |
| $O + H_2 = OH + H$ | .180E + 11 | 1.0 | 8900. |
| $H + HO_2 = OH + OH$ | .250E + 15 | 0.0 | 1900. |
| $O + HO_2 = O_2 + OH$ | .480E + 15 | 0.0 | 1000. |
| $OH + HO_2 = H_2O + O_2$ | .500E + 14 | 0.0 | 1000. |
| $OH + OH = O + H_2O$ | .630E + 13 | 0.0 | 1090. |
| $HO_2 + NO = NO_2 + OH$ | .343E + 13 | 0.0 | −260. |
| $H + NO_2 = NO + OH$ | .350E + 15 | 0.0 | 1500. |
| $O + NO_2 = NO + O_2$ | .100E + 14 | 0.0 | 600. |
| $H + O_2 + M = HO_2 + M$ $H_2O/21**$ | .150E + 16 | 0.0 | −995. |
| $NNH + M = N_2 + H + M$ | .200E + 15 | 0.0 | 30000. |

-continued

| Rate constant K =exp (−E/(1.98)T) | | | |
|---|---|---|---|
| REACTION | A | n | E |
| $NO_2 + M = NO + O + M$ | .110E + 17 | 0.0 | 66000. |
| $NH_3 + M = NH_2 + H + M$ | .480E + 17 | 0.0 | 93929. |
| $O + O + M = O_2 + M$ | .138E + 19 | −1.0 | 340. |
| $NH_2 + NO = N_2 + H_2O$ | .910E + 20 | −2.46 | 1866. |
| $NNH + OH = N_2 + H_2O$ | .300E + 14 | 0.0 | 0. |
| $NNH + NO = N_2 + HNO$ | .906E + 12 | 0.0 | 0. |

**i.e. A = 21 × .15E + 16 for H₂O as "third body".

2. The process of claim 1 wherein the combustion effluent is passing through a cooling zone at the point of ammonia injection.

3. The process of claim 1 wherein about 0.4 to 10 moles of ammonia is injected per mole of NO of the combustion effluent.

4. The process of claim 3 wherein about 1 to 3 moles of ammonia is injected per mole of NO of the combustion effluent.

5. The process of claim 3 wherein the cooling zone in which the ammonia is injected is cooling at a rate of at least about 250° K.

6. The process of claim 5 wherein at least 0.25 volume percent of oxygen is present in the combustion effluent.

* * * * *